(12) United States Patent
Saito et al.

(10) Patent No.: US 6,803,139 B2
(45) Date of Patent: Oct. 12, 2004

(54) ELECTRICALLY CONDUCTIVE RESINOUS COMPOSITION, FUEL CELL SEPARATOR AND PRODUCTION THEREOF, AND POLYMER ELECTROLYTE FUEL CELL

(75) Inventors: Kazuo Saito, Okazaki (JP); Atsushi Hagiwara, Okazaki (JP); Yasuo Imashiro, Chiba (JP); Naofumi Horie, Tokyo (JP); Fumio Tanno, Okazaki (JP); Tsutomu Uehara, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 248 days.

(21) Appl. No.: 09/897,638

(22) Filed: Jul. 3, 2001

(65) Prior Publication Data

US 2002/0028368 A1 Mar. 7, 2002

(30) Foreign Application Priority Data

Jul. 4, 2000 (JP) ...................................... 2000-201832

(51) Int. Cl.$^7$ ................................................ H01M 8/04
(52) U.S. Cl. ............................. 429/32; 429/34; 429/36; 252/511
(58) Field of Search ............................. 429/34, 36, 32; 252/511

(56) References Cited

U.S. PATENT DOCUMENTS 4,339,322 A * 7/1982 Balko et al. ................. 204/255
6,096,818 A * 8/2000 Nakaura et al. ............. 524/412
6,365,069 B2 * 4/2002 Butler et al. ................. 252/511
6,461,755 B1 * 10/2002 Saito et al. .................... 429/34
2003/0008209 A1 * 1/2003 Rahim et al. ................ 429/176

FOREIGN PATENT DOCUMENTS

| EP | 1059348 A1 | * 12/2000 | ........... C09K/19/38 |
| JP | 56-116277 | 9/1981 | |
| JP | 59-26907 | 2/1984 | |
| JP | 09263688 A | * 10/1997 | ........... C08L/67/02 |

* cited by examiner

*Primary Examiner*—Carol Chaney
(74) *Attorney, Agent, or Firm*—Birch, Stewart, Kolasch & Birch, LLP

(57) ABSTRACT

Disclosed herein are an electrically conductive resinous composition composed mainly of an electrically conductive carbon powder and a binding agent, wherein said binding agent is a mixture of a thermoplastic resin and a carbodiimide compound, a fuel cell separator and a process for production thereof, and polymer electrolyte fuel cell. The present invention permits efficient mass production of fuel cell separators having high elasticity, good releasability, good dimensional accuracy, and good gas impermeability. The polymer electrolyte fuel cell, in which all or part of separators are those pertaining to the present invention, is immune to the cracking of separators at the time of assembling, decreases only a little in output after continuous operation, and exhibits good gas sealing performance and high impact resistance.

6 Claims, 2 Drawing Sheets

ELECTRICALLY CONDUCTIVE RESINOUS COMPOSITION, FUEL CELL SEPARATOR AND PRODUCTION THEREOF, AND POLYMER ELECTROLYTE FUEL CELL

BACKGROUND OF THE INVENTION

The present invention relates to an electrically conductive resinous composition, a fuel cell separator made of said electrically conductive resinous composition and a process for production thereof, and a polymer electrolyte fuel cell consisting of a plurality of said fuel cells in which all or part of the separators are said ones.

A fuel cell is an apparatus which has a pair of electrodes, with an electrolyte interposed between them, one electrode being supplied with a fuel and the other electrode being supplied with an oxidizing agent, for the oxidation of fuel to take place electrochemically in the cell, thereby achieving direct conversion from chemical energy into electrical energy. Fuel cells fall into several types according to the electrolyte used therein. There has recently been developed a polymer electrolyte fuel cell which employs a polymer electrolyte membrane as the electrolyte. This fuel cell is attracting attention because of its high output.

The polymer electrolyte fuel cell consists of two fuel cell separators 1 and one polymer electrolyte membrane 2 and two gas diffusion electrodes 3 which are held between the separators, each separator having a plurality of ribs 1a on both sides thereof, as shown in FIG. 1. Tens to hundreds of such fuel cells (as unit cells) are connected together to form a stack of fuel cells.

The polymer electrolyte fuel cell operates in such a way that the electrode for fuel is supplied with hydrogen gas (fluid) and the electrode for oxidizing agent is supplied with oxygen gas (fluid), thereby providing external circuits with current. The following reactions (1) and (2) take place on the two electrodes. On electrode for fuel:

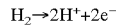

$$H_2 \rightarrow 2H^+ + 2e^- \quad (1)$$

On electrode for oxidizing agent:

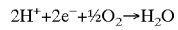

$$2H^+ + 2e^- + \tfrac{1}{2}O_2 \rightarrow H_2O \quad (2)$$

Overall reaction:

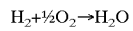

$$H_2 + \tfrac{1}{2}O_2 \rightarrow H_2O$$

In other words, on the electrode for fuel, hydrogen ($H_2$) changes into protons ($H^+$), and these protons move to the electrode for oxidizing agent through the polymer electrolyte membrane. On the electrode for oxidizing agent, the protons react with oxygen ($O_2$) to give rise to water ($H_2O$). Therefore, the operation of polymer electrolyte fuel cell necessitates the supply and discharge of reaction gas and the output of current. The polymer electrolyte fuel cell is usually expected to work in a wet atmosphere at room temperature up to 120° C. Therefore, reaction on the electrode for oxidizing agent gives rise to liquid water, which has to be discharged adequately.

The fuel cell mentioned above includes separators as its constituent parts. As shown in FIGS. 2A and 2B, the separator is a thin platy body having a plurality of ribs 1a on both sides thereof and a plurality of gas feed grooves 4 on one side or both sides thereof. The separators permit fuel gas, oxidizing agent gas, and cooling water to flow through the fuel cell without mixing together. They also lead electric energy or heat evolved in the fuel cell to the outside. The fuel cell separators are required to have good gas barrier properties, conductivity, corrosion resistance, mechanical strength, and impact resistance. Separators should be strong enough to withstand tightening by bolts and nuts at the time of cell assembling. Impact resistance is necessary particularly when fuel cells are used for automobiles.

Separators for polymer electrolyte fuel cell are conventionally made of a carbonaceous composite material which contains a thermoplastic resin or thermosetting resin as a binding agent from the standpoint of productivity and production cost. The use of a thermosetting resin (such as phenolic resin) as a binding gent is disclosed in Japanese Patent Laid-open No. Sho 59-26907, and the use of a thermoplastic resin (such as polypropylene and nylon) as a binding agent is disclosed in Japanese Patent Laid-open No. Sho 56-116277.

The separator made of the above-mentioned carbonaceous composite material is superior in productivity and production cost to the conventional one produced by machining graphite plate; however, it is not necessarily satisfactory in performance such as mechanical strength, chemical resistance, and gas permeability.

SUMMARY OF THE INVENTION

The present invention was completed in view of the foregoing. It is an object of the present invention to provide an electrically conductive resinous composition suitable for mass production of fuel cell separators superior in electrical conductivity, mechanical properties, chemical resistance, gas impermeability, and moldability. It is another object of the present invention to provide a fuel cell separator produced from said electrically conductive resinous composition and a process for production thereof. It is another object of the present invention to provide a polymer electrolyte fuel cell in which all or part of separators are said ones.

In order to achieve the above-mentioned object, the present inventors carried out extensive studies in search of an electrically conductive resinous composition to be made into a fuel cell separator with low resistivity and high mechanical strength. As the result, it was found that the object is achieved with an electrically conductive resinous composition which is composed of an electrically conductive carbon powder and a binding agent which is a mixture of a thermoplastic resin and a carbodiimide compound. This electrically conductive resinous composition affords a fuel cell separator having low resistivity and improved mechanical strength, gas barrier properties, and chemical resistance. It also solves the problem with high-temperature durability which is encountered in the conventional binding agent prepared from a thermoplastic or thermosetting resin alone. This finding is the basis of the present invention.

According to the present invention, the polymer electrolyte fuel cell is constructed such that all or part of its separators are those of the present invention. The fuel cell separator has good electrical conductivity, mechanical strength, chemical resistance, gas barrier properties, and moldability. By virtue of these characteristics, the stack of fuel cells maintains a high operating efficiency (with a small decrease in output) even after continuous operation for a long time. It is suitable for use as a mobile power source for cars and small ships.

The present invention is directed to an electrically conductive resinous composition, a fuel cell separator and production thereof, and a polymer electrolyte fuel cell, as explained in the following.

The first aspect of the present invention covers an electrically conductive resinous composition composed mainly of an electrically conductive carbon powder and a binding agent, wherein the binding agent is a mixture of a thermoplastic resin and a carbodiimide compound.

The second aspect of the present invention covers an electrically conductive resinous composition as defined in the first aspect, wherein the mixture consists of 100 parts by mass of the thermoplastic resin and 0.001–50 parts by mass of the carbodiimide.

The third aspect of the present invention covers an electrically conductive resinous composition as defined in the first or second aspect, wherein the electrically conductive carbon powder is one which has a mean particle diameter of 10 to 500 $\mu$m, and the amount of the electrically conductive carbon powder is 100–1000 parts by mass for 100 parts by mass of the thermoplastic resin.

The fourth aspect of the present invention covers a fuel cell separator which is molded from the electrically conductive resinous composition defined in any of the first to third aspects, wherein the fuel cell separator has on one side or both sides thereof grooves through which an oxidizing gas or fuel gas is supplied, and the fuel cell separator also has a resistivity not higher than 200 m$\Omega$·cm.

The fifth aspect of the present invention covers a process for producing a fuel cell separator from an electrically conductive resinous composition composed mainly of an electrically conductive carbon powder and a binding agent (which is a mixture of a thermoplastic resin and a carbodiimide compound), the fuel cell separator having on one side or both sides thereof grooves through which an oxidizing gas or fuel gas is supplied, the process comprising the steps of injection-molding a mixture of 100 parts by mass of the thermoplastic resin, 0.001–50 parts by mass of the carbodiimide compound, and 100–1000 parts by mass of the electrically conductive carbon powder.

The sixth aspect of the present invention covers a polymer electrolyte fuel cell consisting of a plurality of unit cells connected together, each unit cell consisting of a pair of electrodes holding a polymer electrolyte membrane between them and a pair of separators holding the electrodes between them, the separator having passages molded thereon through which gas is supplied and discharged, characterized in that all or part of the separators in the fuel cells are those which are defined in the fourth aspect.

The seventh aspect of the present invention covers a polymer electrolyte fuel cell as defined in the sixth aspect, which retains no less than 85% of its initial output after continuous operation for 200–500 hours.

The above and other objects, features and advantages of the present invention will become apparent from the following description and the appended claims, taken in conjunction with the accompanying drawings in which like parts or elements denoted by like reference symbols.

DESCRIPTION OF PREFERRED EMBODIMENTS

Figure 1:
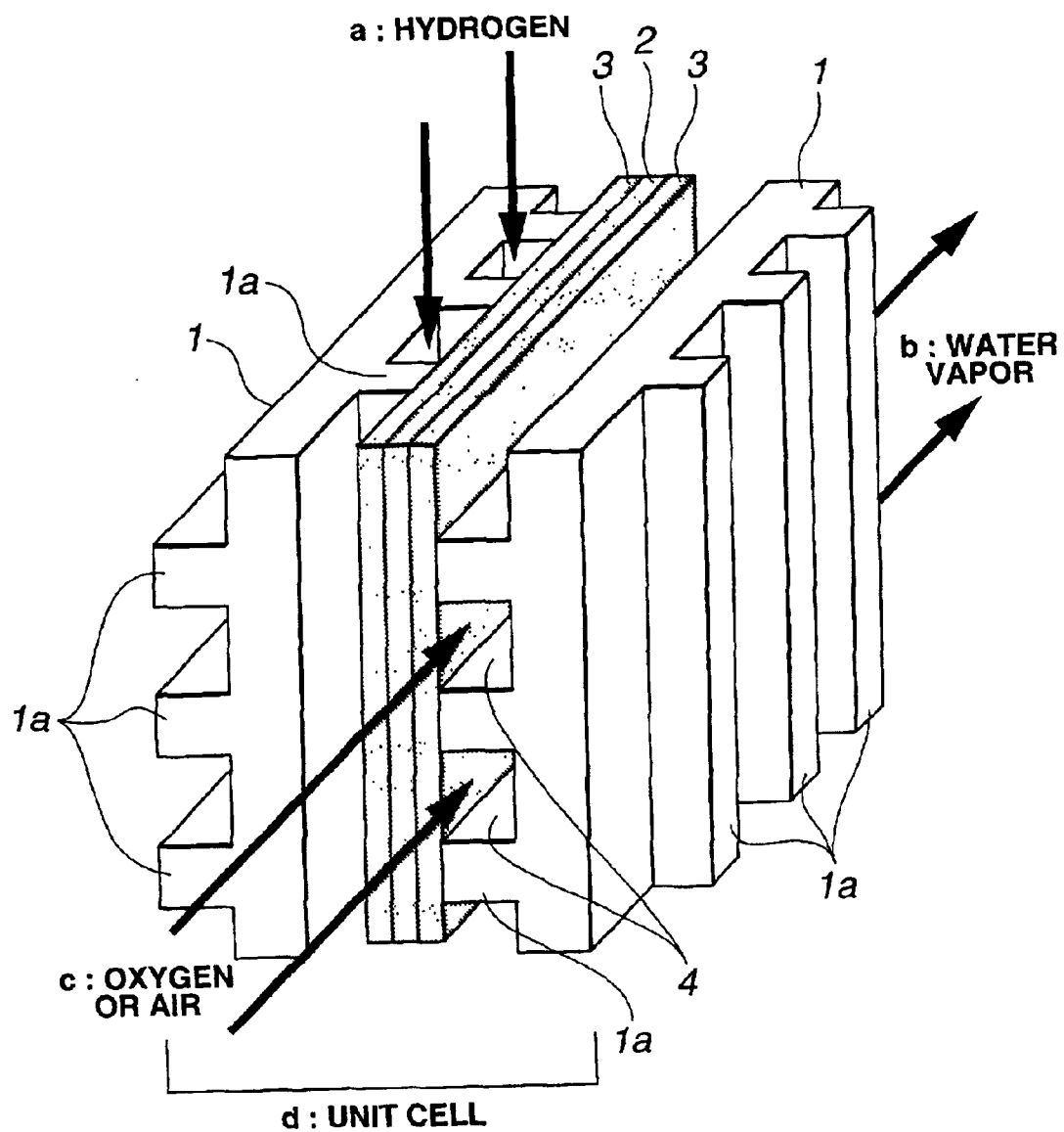
FIG. 1 is a perspective view showing one example of the fuel cell.

The invention will be described in more detail below. According to the present invention, the electrically conductive resinous composition is composed mainly of (A) a binding agent and (B) an electrically conductive carbon powder. The binding agent as component (A) is a mixture of (A-1) a thermoplastic resin and (A-2) a carbodiimide compound.

The thermoplastic resin as component (A-1) is not specifically restricted. Any known thermoplastic resins can be used. They include styrene resins such as acrylonitrile-butadiene-styrene resin (ABS), acrylonitrile-styrene copolymer (AS), high-impact polystyrene (HIPS), polystyrene (PS), methyl methacrylate-butadiene-styrene copolymer (MBS), methyl methacrylate-styrene copolymer (MS), acrylonitrile-ethylene-propylene rubber-styrene copolymer (AES), and acrylonitrile-styrene-acrylate (AAS), polyolefin resins such as polyethylene (PE), polypropylene (PP), polybutene-1, ethylene-vinyl acetate copolymer (EVA), and ethylene-vinyl alcohol copolymer (EVOH), polyamide resin, thermoplastic polyester resin, polycarbonate resin (PC), wholly aromatic polyester resin, polyphenylene sulfide (PP), polyvinyl chloride resin (PVC), polysulfone resin, polyether-ether-ketone resin, (modified) polyphenylene ether resin, polyoxymethylene (POM), polymethyl methacrylate (acrylic resin) (PMMA), fluoroplastic resin, polyketone resin (PK), norbornane, polyamideimide (PAI), and polyphthalamide (PPA). They may be used alone or in combination with one another.

To be more specific, the above-mentioned polyamide resin includes the one which is obtained by polycondensation from a linear diamine represented by the general formula $H_2N-(CH_2)_x-NH_2$ (where x is an integer of 4 to 12) and a linear dicarboxylic acid represented by the general formula $HO_2C-(CH_2)_y-CO_2H$ (where y is an integer of 2 to 12).

Examples of the polyamide resin include nylon-66, nylon-610, nylon-612, nylon-6, nylon-12, nylon-11, and nylon-46. Additional examples include copolymer polyamides such as nylon-6/6,6 nylon-6/6,10, nylon-6/12, nylon-6/6,12, nylon-6/6,6/6,10, and nylon-6/6,6/12. Other examples include nylon-6/6,T (T=terephthalic acid), semiaromatic polyamides obtained from an aromatic dicarboxylic acid (such as terephthalic acid and isophthalic acid) and m-xylylenediamine or an alicyclic diamine, polyamides obtained from m-xylylenediamine and the above-mentioned linear dicarboxylic acid, and polyester amides. They may be used alone or in combination with one another.

The above-mentioned thermoplastic polyester resin include those which are obtained by polycondensation from an aromatic dicarboxylic acid (or an ester thereof or an ester-forming derivative) and a diol. The above-mentioned aromatic dicarboxylic acid includes naphthalene dicarboxylic acid (such as naphthalene-2,6-dicarboxylic acid), terephthalic acid, isophthalic acid, p-hydroxybenzoic acid, adipic acid, and sebacic acid. Their ester-forming derivatives can also be used. The above-mentioned diol includes polymethylene glycol (having 2–6 carbon atoms) such as ethylene glycol, 1,4-butanediol, and 1,6-hexanediol, 1,4-cyclohexanediol, bisphenol-A, and their ester-forming derivative.

Examples of the thermoplastic polyester resin include polyethylene terephthalate (PET), polybutylene terephthalate (PBT), polyethylene naphthalate (PEN), and bisphenol-A isophthalate. They may be used alone or in combination with one another.

The carbodiimide compound as component (A-2) may be any carbodiimide compound (mono- or polycarbodiimide compound) having one or more carbodiimide groups in the molecule.

The monocarbodiimide compound may be synthesized by any known process, such as the one which consists of decarboxylating a polyisocyanate at about 70° C. or above in the absence of solvent or in an inert solvent with the aid of a catalyst such as 3-methyl-1-phenyl-2-phospholene-1-oxide.

Examples of the monocarbodilmide compound include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, and di-β-naphthylcarbodiimide. Of these examples, dicyclohexylcarbodiimide and diisopropylcarbodiimide are desirable from the standpoint of commercial availability.

There are various polycarbodiimde compounds produced in different ways. The basic production process is disclosed in U.S. Pat. No. 2,941,956; Japanese Patent Publication No. Sho-33279; J. Org. Chem., 28, 2069–2075 (1963); and Chemical Review 1981, Vol. 81, No. 4, p. 619–621.

Examples of the polycarbodiimide compound include (4,4'-dicyclohexylmethane) polyacrbodiimide, (4,4'-diphenylmethane) polycarbodiimide, hexamethylenepolycarbodiimide, isophoronepolycarbodiimide, tetramethylxylylenepolycarbodiimide, and 1,3,5-triisopropylbenzenepolycabodiimide. They may be used alone or in combination with one another.

To be more specific, the above-mentioned polycarbodiimide compound may be synthesized by condensation of organic diisocyanate with removal of carbon dioxide. This condensation gives rise to polycarbodiimide with isocyanate terminals.

The organic diisocyanate used as a raw material for the synthesis of polycarbodiimide compound by the above-mentioned process is exemplified by an aromatic diisocyanate, an aliphatic diisocyanate, or an alicyclic diisocyanate, or a mixture thereof. Their typical examples are 1,5-naphthylenediisocyanate, 4,4'-diphenylmethanediisocyanate, 4,4'-diphenyldimethylmethanediisocyanate, 1,3-phenylenediisocyanate, 1,4-phenylenediisocyanate, 2,4-tolylenediisocyanate, 2,6-tolylenediisocyanate, a mixture of 2,4-tolylenediisocyante and 2,6-tolylenediisocyanate, hexamethylenediisocynate, cyclohexane-1,4-diisocyanate, xylylenediisocyanate, isophoronediisocyanate, dicyclohexylmethane-4,4-diisocyanate, methylcyclohexanediisocyanate, and tetramethylxylylenediisocyanate.

The above-mentioned organic diisocyanate may be used in the form of polymer having an adequate degree of polymerization. Such a polymer may be formed by reacting the terminal isocyanate with a monoisocyanate, such as phenylisocyanate, tolylisocyanate, dimethylphenylisocyanate, cyclohexylisocyanate, butylisocyanate, and naphthylisocyanate.

There are additional terminal blocking agents which are active hydrogen compounds capable of reaction with isocyanate groups. They are aliphatic, aromatic, and alicyclic compounds having —OH groups (such as methanol, ethanol, phenol, cyclohexanol, N-methylethanolamine, polyethylene glycol monomethyl ether, and polypropylene glycol monomethyl ether), having =NH groups (such as diethylamine and dicyclohexylamine), having —$NH_2$ groups (such as butylamine and cyclohexylamine), having —COOH groups (such as succinic acid, bezonic acid, and cyclohexanoic acid), having —SH groups (such as ethylmercaptan, arylmercaptan, and thiophenol), and having epoxy groups.

The condensation reaction of an organic diisocyanate with removal of carbon dioxide proceeds in the presence of a carbodiimidizing catalyst. Examples of this catalyst include 1-phenyl-2-phospholene-1-oxide, 3-methyl-2-phospholene-1-oxide, 1-ethylene-2-phospholene-1-oxide, and 3-methyl-1-phenyl-2-phospholene-1-oxide. Additional examples include phsopholene oxide of 3-phospholene isomers. Of these example, 3-methyl-1-phenyl-2-phospholene-1-oxide is suitable from the standpoint of reactivity. This catalyst may be used in catalytic amounts.

The carbodiimide compound as component (A-2) should be used in an amount of 0.001–50 parts by mass, preferably 0.01–10 parts by mass, more preferably 0.1–10 parts by mass, most preferably 0.5–5 parts by mass, for 100 parts by mass of the thermoplastic resin as component (A-1). With an excessively small amount, the carbodiimide compound as component (A-2) will adversely affect the strength and gas impermeability of the separator. Conversely, with an excessively large amount, it will make the molding material to have excessive adhesion which impedes demolding.

The electrically conductive carbon powder as component (B) is exemplified by carbon black, acetylene black, Ketjen black, flake graphite, massive graphite, artificial graphite, kish graphite, amorphous carbon, and expansible graphite. They may be used alone or in combination with one another. Of these examples, flake graphite and artificial graphite are preferable.

The electrically conductive carbon powder should be one which has a mean particle diameter of 10–500 μm, preferably 30–300 μm. One which is coarser than specified above should be crushed by means of a mixer, jet mill, ball mill, pin mill, or freezing grinding, or classified by means of a vibrating sieve, rotex screen, sonic screen, microclassifier, or Spesdic classifier, so that the desired particle size is obtained.

Moreover, the electrically conductive carbon powder should preferably be one which has the above-mentioned mean particle diameter (D) and the following particle size distribution.

| | |
|---|---|
| D < 10 (μm) | less than 1% |
| 10 ≤ D < 700 (μm) | 50–99% |
| D ≥ 700 (μm) | remainder |

The above-mentioned electrically conductive carbon powder as component (B) should be added in an amount of 100–10000 parts by mass, preferably 200–2000 parts by mass, more preferably 400–900 parts by mass, for 100 parts by mass of the thermoplastic resin as component (A-1). With an excessively large amount, it would adversely affect the gas barrier properties and strength of the separator. With an excessively small amount, it would not impart sufficient conductivity to the separator.

The electrically conductive resinous composition of the present invention may be incorporated with, in addition to the above-mentioned components (A-1), (A-2), and (B), optional additives such as fibrous base material, filler, mold release, metal powder, and hydrolysis resisting agent, for improvement in strength, mold releasability, hydrolysis resistance, and conductivity.

The above-mentioned fibrous base material includes inorganic fiber and organic fiber. Inorganic fiber includes metal fiber (iron, copper, brass, bronze, aluminum, etc.), ceramics fiber, potassium titanate fiber, glass fiber, carbon fiber, gypsum fiber, rock wool, wollastonite, sepiolite, attapulgite, and artificial mineral fiber. Organic fiber includes aramid fiber, polyimide fiber, polyamide fiber, phenolic fiber, cellulose, and acrylic fiber. They may be used alone or in combination with one another. The fibrous base material should be used in an amount of 0–100 parts by mass for 100 parts by mass of the thermoplastic resin as component (A-1).

The above-mentioned filler includes granular inorganic and organic fillers. They are silicates such as wollastonite, sericite, mica, clay, bentonite, asbestos, talc, and alumina silicate; metal oxides such as alumina, silicon oxide, magnesium oxide, zirconium oxide, and titanium oxide; carbonates such as calcium carbonate, magnesium carbonate, and dolomite; sulfates such as calcium sulfate and barium sulfate; glass beads, boron nitride, silicon carbide, and silica. These fillers may be hollow or porous ones. They may be previously surface-treated with a silane coupling agent, carbodiimide, or emulsion for improved adhesion to the thermoplastic resin as the binding agent. The filler should be added in an amount of 0–10000 parts by mass for 100 parts by mass of the thermoplastic resin as component (A-1).

The above-mentioned mold release is not specifically restricted; it includes silicone-based mold release agents, fluorine-based mold release agents, metallic soap-based mold release agents, amide-based mold release agents, and wax-based mold release agents. Internal mold release agents such as carnauba wax, stearic acid, and montanic acid are preferable. The mold release should be used in an amount of 0–30 parts by mass for 100 parts by mass of the thermoplastic resin as component (A-1).

The above-mentioned metal powder includes those of stainless steel, gold, silver, copper, platinum, titanium, aluminum, and nickel. The metal powder should be one which has a mean particle diameter of 5–30 μm.

According to the present invention, the fuel cell separator is produced by injection molding from a mixture of three components (A-1), (A-2), and (B). The amount of component (A-1), which is a thermoplastic resin, is 100 parts by mass. The amount of component (A-2), which is a carbodiimide compound, is 0.001–50 parts by mass. The amount of component (B), which is an electrically conductive carbon powder, is 100–10000 parts by mass. Injection molding is suitable for mass production.

The above-mentioned three components, together with optional additives, should be kneaded by melting by means of a Banbury mixer, rubber roll, kneader, or single-screw or twin-screw extruder. The melting temperature ranges from 150° C. to 450° C.

For better dispersion, the above-mentioned components (thermoplastic resin, carbodiimide compound, electrically conductive carbon powder, and filler) may be previously mixed in the usual way by means of a stirrer, ball mill, sample mixer, static mixer, ribbon blender, or the like, prior to melt-kneading.

The thus obtained electrically conductive resinous composition of the present invention may undergo molding in molten state. Alternatively, it may be pelletized before molding. Resulting pellets may be dried in the usual way, such as fluidized-bed drying, hot-air circulation drying, vacuum drying, and vacuum fluidized-bed drying.

The resulting mixture is injection-molded using an injection molding machine equipped with a mold that affords the separator having on one side or both sides thereof grooves through which oxidizing gas or fuel gas is supplied. In this way there is obtained the fuel cell separator.

The conditions of injection molding vary depending on the injection molding machine and the kind and amount of the binding agent. The following conditions are usually desirable.

| | |
|---|---|
| Cylinder temperature: | 150–440° C. |
| Injection speed: | 100–6000 mm/sec |
| Injection time: | 5–120 seconds |
| Mold temperature: | 20–300° C. |

Injection molding is not an only method of producing the fuel cell separator of the present invention. Other known molding methods that can be used individually or in combination include compression molding, injection-compression molding, transfer molding, extrusion molding, hydrostatic molding, belt pressing, and roll molding.

Figure 2A:
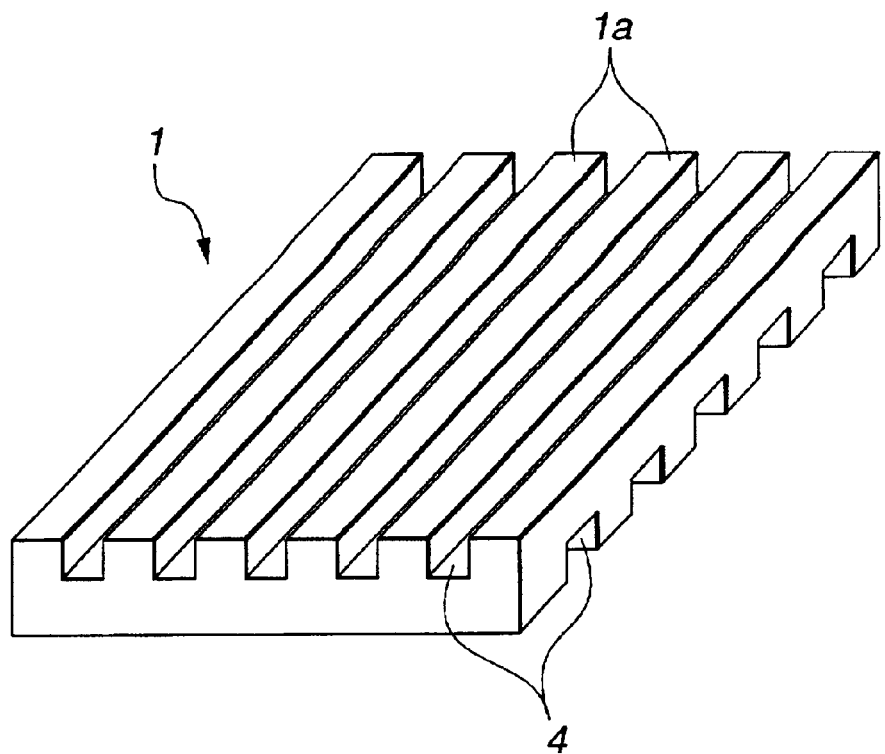
FIGS. 2A and 2B are perspective views showing the fuel cell separator pertaining to one embodiment of the present invention.
Figure 2B:
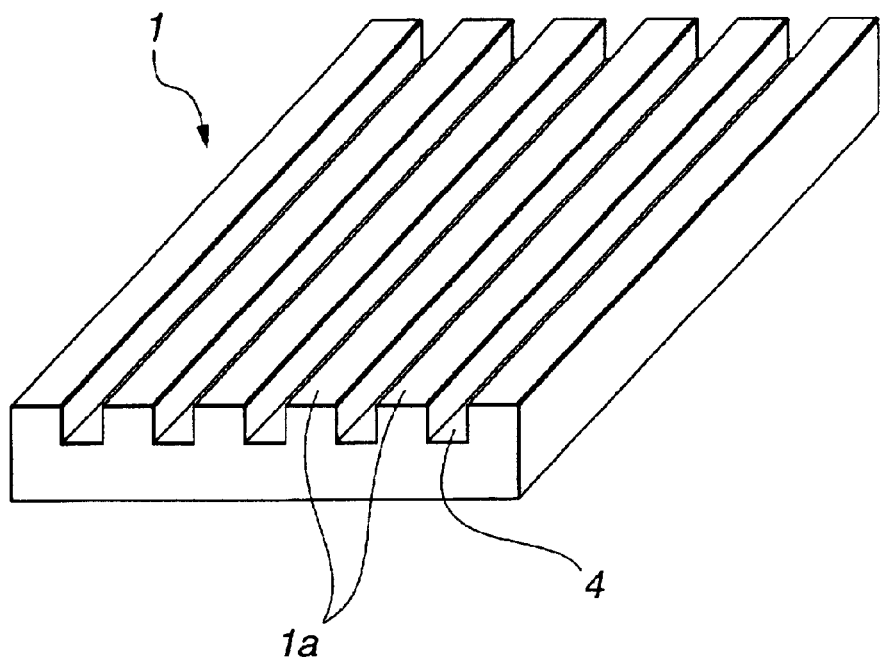

The production by injection molding according to the present invention permits efficient mass production despite the fact that the fuel cell separator has a complex shape with a plurality of ribs 1a and grooves 4 (on one side or both sides) as shown in FIGS. 2A and 2B.

The fuel cell separator of the present invention separates the fuel electrode and the oxidizing agent electrode from each other. It also functions to efficiently diffuse the fuel gas and oxidizing agent gas into the fuel cell. Therefore, it is flat and has extended, complexly bent gas passages and through holes called manifold.

The fuel cell separator obtained as mentioned above should have a specific resistance not higher than 200 Ω·cm, preferably not higher than 50 mΩ·cm, more preferably 2–30 mΩ·cm, which is measured according to JIS H0602 providing the four point probe method for measuring the specific resistance of silicon single crystal and silicon wafer.

The fuel cell separator of the present invention should have mechanical strength such that a test piece (100 mm×10 mm×4 mm) prepared from the resinous composition according to JIS K6911 proving "General test methods for thermosetting plastics" has a flexural strength of 20–80 MPa, preferably 25–60 MPa, a flexural modulus of 0.31–10 GPa, preferably 0.5–5 GPa, and a strain of 2–15 mm, preferably 3–12 mm.

The fuel cell separator of the present invention should have gas permeability such that a specimen (2 mm thick, 100 mm in diameter) prepared from the resinous composition according to JIS K7126 providing "Method of evaluating the gas permeability of plastics film" (method B, equal pressure method) has a nitrogen gas permeability (at 23° C.) not higher than 50 ml/m$^2$·24 hr·atm, preferably not higher than 30 ml/m$^2$·24 hr·atm, and more preferably not higher than 20 ml/m$^2$·24 hr·atm.

The present invention covers a polymer electrolyte fuel cell consisting of a plurality of unit cells connected together, each unit cell consisting of a pair of electrodes holding a polymer electrolyte membrane between them and a pair of separators holding the electrode between them, the separator having passages molded thereon through which gas is supplied and discharged. This fuel cell is characterized in that all or part of the separators in the unit cells are those of the present invention.

The fuel cell consists of unit cells, each unit cell consisting of a fuel cell and a pair of separators, as shown in FIG. 1. The fuel cell consists of one polymer electrolyte membrane 2 and two electrodes 3 (one for fuel gas and the other for oxidizing agent) tightly holding the membrane between them. The separators pertain to the present invention. One separator 1 adjacent to the electrode for fuel gas has a plurality of passages and manifolds for fuel gas, and the other separator 1 adjacent to the electrode for oxidizing agent has a plurality of passages and manifolds for oxidizing agent.

These unit cells are stuck in series and tightened between insulating plates supported by pressing plates. One electrode is supplied with fuel gas and the other electrode is supplied with oxidizing agent gas, so that the fuel cells generates direct current.

According to the present invention, the fuel cell is characterized in that all or part of separators therein are those which are defined above in the present invention. To be more specific, the percentage of the separators of the present invention in all the separators of the fuel cell should be higher than 50%, preferably 50–100%, more preferably 70–100%, and most desirably 80–100%. If this percentage is lower than specified above, the fuel cell will decrease in output after continuous run for a long time or the fuel cell becomes poor in gas seal and impact resistance because separators crack when tightened for assembling. In the case where the separators of the present invention are used partly, the rest may be supplied with conventional separators.

The above-mentioned polymer electrolyte membrane may be any ordinary one which is used for polymer electrolyte fuel cell. For example, it may be a proton-conducting ion-exchange membrane made of fluoroplastic resin, such as polytrifluorosulfonic acid and perfluorocarbonsulfonic acid ("Nafion"). The electrolyte membrane is coated with "Nafion 117 solution", which is a paste of a catalyst dispersed in a mixed solvent of water and lower aliphatic alcohol containing perfluorocarbon sulfonic acid. The catalyst is platinum or platinum alloy supported on carbon powder.

The pair of electrodes holding the polymer electrolyte membrane between them may be formed from carbon paper, carbon felt, or carbon cloth woven from carbon fiber.

The two electrodes are bonded to both sides of the polymer electrolyte membrane so that they are made into one piece. Bonding may be accomplished by hot-pressing at 120–130° C. or with the aid of an adhesive.

The unified combination of the electrodes and electrolyte membrane is held between a pair of separators in such a way that the separators form passages for fuel gas supply and discharge. Thus there is obtained the unit cell. Firm bonding may be ensured with an adhesive applied to the ribs of the separator in contact with the electrode.

The polymer electrolyte fuel cell which is constructed according to the present invention is immune to the cracking of separators at the time of assembling, decreases only a little in output after continuous operation for a long time, and exhibits high operating efficiency, good gas sealing, and high impact resistance. These advantages stem from the fact that all or part (preferably more than 50%) of the separators in the fuel cells are those separators pertaining to the present invention which have high elasticity and good gas impermeability. By virtue of these characteristic properties, the fuel cell is suitable for use as a mobile power source for cars, hybrid cars, and small ships.

The polymer electrolyte fuel cell according to the present invention should retain its initial output more than 85%, preferably more than 90%, more preferably 95–100%, after continuous operation for 200–500 hours. It is characterized by a very small decrease in output after continuous operation.

Incidentally, the polymer electrolyte fuel cell according to the present invention will find use not only as a portable power source for cars, hybrid cars, small ships, etc. but also as a power source for local electric supply, domestic use, camping sites, artificial satellites, and space development.

The present invention permits efficient mass production of fuel cell separators having high elasticity, good releasability, good dimensional accuracy, and good gas impermeability. The polymer electrolyte fuel cell, in which all or part of separators are those pertaining to the present invention, is immune to the cracking of separators at the time of assembling, decreases only a little in output after continuous operation, and exhibits good gas sealing performance and high impact resistance.

EXAMPLES

The invention will be described in more detail with reference to the following synthesis examples, working examples, and comparative examples, which are not intended to limit the scope thereof. In Tables 1 to 5, the amount of each component is given in terms of parts by mass.

Synthesis Example 1

PCD1

(4,4'-dicyclohexylmethane)polycarbodiimide (referred to as PCD1 hereinafter) was obtained from 1000 g of 4,4'-dicyclohexyldiisocyanate (HMDI) by reaction at 180° C. for 12 hours with the aid of a carbodiimidizing catalyst, which is 1.0 g of 3-methyl-1-phenyl-phospholene-1-oxide.

Synthesis Example 2

PCD2

(4,4'-diphenylmethane)polycarbodiimide (referred to as PCD2 hereinafter) was obtained from 1000 g of 4,4'-diphenyl-methane-4,4'-diisocyanate by reaction at 120° C. for 12 hours in 9000 g of tetrachloroethylene with the aid of a carbodiimidizing catalyst, which is 1.0 g of 3-methyl-1-phenyl-2-phospholene-1-oxide.

Synthesis Example 3

PCD3

Dicyclohexylcarbodiimide (referred to as PCD3 hereinafter) was obtained from 1000 g of cyclohexyl-isocyanate by reaction at 120° C. for 12 hours with the aid of a carbodiimidizing catalyst, which is 1.0 g of 3-methyl-1-phenyl-2-pholpholene-1-oxide.

The components in each example shown in Tables 1 to 5 were mixed together. The resulting mixture was kneaded through a twin-screw extruder to give a master batch. The resulting master batch was injection-molded into multi-purpose dumbbell-shaped specimens (10 mm wide, 4 mm thick, and 100 mm long) conforming to JIS K7139.

The specimens were tested for physical properties in the following manner. The results are shown in Tables 1 to 5.

Flexural Test:

Flexural strength and flexural modulus were measured by using an Instron-type universal tester, Model 5544. (support span=80 mm, rate of load application=0.5 mm/min)

Resistivity:

Measured according to JIS H0602 (four point probe method) by using Nakamura Seimitsu's Model 2-10.

The above-mentioned master batch was made into a fuel cell separator (100 mm square, 2 mm thick) by injection is molding.

The resulting separator was examined for moldability, density, and gas permeability in the following manner. The results are shown in Tables 1 to 5.

Moldability

○: good

Δ: fair

X: poor

Density

Calculated by dividing the weight of the separator by the volume of the separator.

Gas Permeability

Measured according to JIS K7126, Method B.

The fuel separators obtained in working examples and comparative examples were incorporated into a polymer electrolyte fuel cell in the usual way. The fuel cell was run for 200 hours, and the decrease from the initial voltage was measured. After operation for 200 hours, the fuel cell is disassembled and the separators were examined for external appearance. The results are shown in Tables 1 to 5.

TABLE 1

| | Example No. | | | | | | | | |
|---|---|---|---|---|---|---|---|---|---|
| | 1 | 2 | 3 | 4 | 5 | 6 | 7 | 8 | 9 |
| Thermoplastic resin | ABS | HDPE | PP | PA6 | PBT | PC | PAR | POM | PPS |
| | 100 | 100 | 100 | 100 | 100 | 100 | 100 | 100 | 100 |
| PCD1 | 1 | 1 | 1 | 1 | 1 | 1 | 1 | 1 | 1 |
| Flake graphite | 900 | 900 | 900 | 900 | 900 | 900 | 900 | 900 | 900 |
| Flexural strength (MPa) | 40 | 20 | 33 | 45 | 44 | 32 | 36 | 15 | 45 |
| Flexural modulus (MPa) | 2050 | 1240 | 840 | 1930 | 2094 | 2090 | 2135 | 1444 | 1670 |
| Resistivity (mΩ · cm) | 12.7 | 24.3 | 25.3 | 18.7 | 15.2 | 16.0 | 14.2 | 3.5 | 7.9 |
| Moldability | ○ | ○ | ○ | ○ | ○ | ○ | ○ | ○ | ○ |
| Density | 1.9 | 1.83 | 1.77 | 1.94 | 1.96 | 1.95 | 1.95 | 1.96 | 1.94 |
| Gas permeability (ml/m$^2$ · day · atm) | ≦50 | ≦50 | ≦50 | ≦50 | ≦50 | ≦50 | ≦50 | ≦50 | ≦50 |
| Decrease in voltage (%) | 99 | 99 | 98 | 98 | 99 | 99 | 99 | 99 | 98 |
| Appearance of separator | good | good | good | good | good | good | good | good | good |

TABLE 2

| | Example No. | | | | | | | | |
|---|---|---|---|---|---|---|---|---|---|
| | 10 | 11 | 12 | 13 | 14 | 15 | 16 | 17 | 18 |
| Thermoplastic resin | PPE | PTFE | PES | PSF | PK | PMMA | Norbornane | PAI | PPA |
| | 100 | 100 | 100 | 100 | 100 | 100 | 100 | 100 | 100 |
| PCD1 | 1 | 1 | 1 | 1 | 1 | 1 | 1 | 1 | 1 |
| Flake graphite | 900 | 900 | 900 | 900 | 900 | 900 | 900 | 900 | 900 |
| Flexural strength (MPa) | 53 | 47 | 55 | 54 | 31 | 47 | 46 | 50 | 49 |
| Flexural modulus (MPa) | 1780 | 1457 | 2440 | 1995 | 1120 | 2685 | 2573 | 1365 | 1763 |
| Resistivity (mΩ · cm) | 7.8 | 17.3 | 10.1 | 12.3 | 15.6 | 7.4 | 9.4 | 13.5 | 15.8 |
| Moldability | ○ | ○ | ○ | ○ | ○ | ○ | ○ | ○ | ○ |
| Density | 1.9 | 1.96 | 1.94 | 1.93 | 1.9 | 1.9 | 1.92 | 1.92 | 1.93 |
| Gas permeability (ml/m$^2$ · day · atm) | ≦50 | ≦50 | ≦50 | ≦50 | ≦50 | ≦50 | ≦50 | ≦50 | ≦50 |
| Decrease in voltage (%) | 98 | 99 | 99 | 98 | 98 | 99 | 99 | 99 | 99 |
| Appearance of separator | good | good | good | good | good | good | good | good | good |

TABLE 3

| | Example No. | | | | | | | | |
|---|---|---|---|---|---|---|---|---|---|
| | 19 | 20 | 21 | 22 | 23 | 24 | 25 | 26 | 27 |
| Thermoplastic resin | HMPE | SiPE | HDPE | HDPE | PA6 | PA6 | PA6 | PA/PC | PPS/LCP |
| | 100 | 100 | 100 | 100 | 100 | 100 | 100 | 100 | 100 |
| PCD1 | 1 | 1 | 1 | 1 | — | — | 1 | 1 | 1 |
| PCD2 | — | — | — | — | 1 | — | — | — | — |
| PCD3 | — | — | — | — | — | 1 | — | — | — |
| Flake graphite | 900 | 900 | 100 | 1000 | 900 | 900 | 900 | 900 | 900 |
| Carbon fiber | — | — | — | — | — | — | 10000 | — | — |

TABLE 3-continued

| | Example No. | | | | | | | | |
|---|---|---|---|---|---|---|---|---|---|
| | 19 | 20 | 21 | 22 | 23 | 24 | 25 | 26 | 27 |
| Flexural strength (MPa) | 28 | 20 | 80 | 10 | 45 | 44 | 10 | 39 | 30 |
| Flexural modulus (MPa) | 830 | 650 | — | 453 | 2062 | 1883 | 397 | 2080 | 2200 |
| Resistivity (mΩ · cm) | 15.2 | 40 | 190 | 2 | 19.2 | 19.5 | 3.3 | 18 | 7.0 |
| Moldability | O | O | O | O | O | O | O | O | O |
| Density | 1.9 | 1.92 | 1.5 | 1.7 | 1.52 | 1.53 | 1.9 | 1.92 | 1.94 |
| Gas permeability (ml/m$^2$ · day · atm) | ≦50 | ≦50 | ≦50 | ≦50 | ≦50 | ≦50 | ≦50 | ≦50 | ≦50 |
| Decrease in voltage (%) | 98 | 99 | 80 | 90 | 98 | 98 | 90 | 99 | 98 |
| Appearance of separator | good | good | good | good | good | good | good | good | good |

Example 26: PA/PC = 50/50 (by weight)
Example 27: PPS/LCP = 50/50 (by weight)

TABLE 4

| | Comparative Example No. | | | | | | | | | |
|---|---|---|---|---|---|---|---|---|---|---|
| | 1 | 2 | 3 | 4 | 5 | 6 | 7 | 8 | 9 | 10 |
| Thermoplastic resin | ABS | HDPE | PP | PA6 | PBT | PC | PAR | POM | PPS | PPE |
| | 100 | 100 | 100 | 100 | 100 | 100 | 100 | 100 | 100 | 100 |
| Flake graphite | 900 | 900 | 900 | 900 | 900 | 900 | 900 | 900 | 900 | 900 |
| Flexural strength (MPa) | 38 | 18 | 31 | 43 | 40 | 30 | 34 | 14.3 | 51 | 49 |
| Flexural modulus (MPa) | 2046 | 1205 | 836 | 1923 | 2085 | 2093 | 2133 | 1444 | 1670 | 1773 |
| Resistivity (mΩ · cm) | 13.7 | 26.4 | 25.8 | 20.7 | 17.6 | 16.0 | 16.5 | 3.5 | 7.9 | 10.5 |
| Density | 1.9 | 1.83 | 1.77 | 1.94 | 1.96 | 1.95 | 1.95 | 1.96 | 1.94 | 1.9 |
| Gas permeability (ml/m$^2$ · day · atm) | 1200 | 1400 | 1300 | 1000 | 1400 | 1200 | 1200 | 1300 | 1240 | 1300 |
| Decrease in voltage (%) | 40 | 30 | 20 | 40 | 20 | 30 | 45 | 40 | 30 | 30 |
| Appearance of separator | poor | poor | poor | poor | poor | poor | poor | poor | poor | poor |

TABLE 5

| | Comparative Example No. | | | | | | | | | |
|---|---|---|---|---|---|---|---|---|---|---|
| | 11 | 12 | 13 | 14 | 15 | 16 | 17 | 18 | 19 | 20 |
| Thermoplastic resin | PTFE | PES | PSF | PK | PMMA | Norbornane | PAI | PPA | HMPE | SiPE |
| | 100 | 100 | 100 | 100 | 100 | 100 | 100 | 100 | 100 | 100 |
| Flake graphite | 900 | 900 | 900 | 900 | 900 | 900 | 900 | 900 | 900 | 900 |
| Flexural strength (MPa) | 46.3 | 51 | 51 | 28.4 | 44.8 | 43 | 48.4 | 46.1 | 25.4 | 18.2 |
| Flexural modulus (MPa) | 1455 | 2439 | 1995 | 1142 | 2684 | 2568 | 1355 | 1756 | 795 | 600 |
| Resistivity (mΩ · cm) | 18.6 | 11.2 | 14.4 | 15.9 | 7.4 | 11.5 | 15.6 | 18.9 | 29.5 | 44.3 |
| Density | 1.96 | 1.94 | 1.93 | 1.9 | 1.9 | 1.92 | 1.92 | 1.93 | 1.9 | 1.92 |
| Gas permeability (ml/m$^2$ · day · atm) | 1300 | 1200 | 1200 | 1200 | 1100 | 1300 | 1400 | 1200 | 1300 | 1200 |
| Decrease in voltage (%) | 45 | 40 | 35 | 30 | 30 | 40 | 40 | 30 | 45 | 40 |
| Appearance of separator | poor | poor | poor | poor | poor | poor | poor | poor | poor | poor |

The names of the thermoplastic resins in Tables 1 to 5 are abbreviated as follows.
  ABS: acrylonitrile-butadiene-styrene
  HDPE: high-density polyethylene
  PP: polypropylene
  PA6: polyamide 6
  PBT: polybutylene terephthalate
  PC: polycarbonate
  PAR: polyarylate
  POM: polyoxymethylene (acetal)
  PPS: polyphenylene sulfide
  PPE: polyphenylene ether PTFE: polytetrafluoroethylene
PES: polyether sulfone
PSF: polysulfone
PK: polyketone
PMMA: polymethyl methacrylate
PAI: polyamideimide
PPA: polyphthalamide
HMPE: ultra-high-molecular-weight polyethylene
SiPE: Si-crosslinked polyethylene
LCP: liquid-crystal polymer

What is claimed is:

1. An electrically conductive resinous composition comprising mainly an electrically conductive carbon powder and a binding agent, wherein
    said binding agent comprises a mixture of a thermoplastic resin and a carbodiimide compound
    wherein the electrically conductive carbon powder is one which has a mean particle diameter of 10 to 500 $\mu$m, and the amount of the electrically conductive carbon powder is 100–10,000 parts by mass for 100 parts by mass of the thermoplastic resin.

2. An electrically conductive resinous composition as defined in claim 1, wherein the mixture consists of 100 parts by mass of the thermoplastic resin and 0.001–50 parts by mass of the carbodiimide.

3. A fuel cell separator which is molded from the electrically conductive resinous composition defined in claim 1, wherein the fuel cell separator has on one side or both sides thereof grooves through which an oxidizing gas or fuel gas is supplied, the fuel cell separator also has a specific resistance not higher than 200 m$\Omega\cdot$cm.

4. A process for producing a fuel cell separator from an electrically conductive resinous composition composed mainly of an electrically conductive carbon powder and a binding agent (which is a mixture of a thermoplastic resin and a carbodiimide compound), said fuel cell separator having on one side or both sides thereof grooves through which an oxidizing gas or fuel gas is supplied, said process comprising the step of:
    injection-molding a mixture of 100 parts by mass of the thermoplastic resin, 0.001–50 parts by mass of the carbodiimide compound, and 100–1000 parts by mass of the electrically conductive carbon powder.

5. A polymer electrolyte fuel cell consisting of a plurality of unit cells connected together, each unit cell consisting of a pair of electrodes holding a polymer electrolyte membrane between them and a pair of separators holding the electrodes between them, said separator having passages molded thereon through which gas is supplied and discharged, wherein all or part of the separators in the fuel cells are those which are defined in claim 3.

6. A polymer electrolyte fuel cell as defined in claim 5, which retains no less than 85% of its initial output after continuous operation for 200–500 hours.

* * * * *